(12) United States Patent
Artes et al.

(10) Patent No.: US 10,860,029 B2
(45) Date of Patent: Dec. 8, 2020

(54) METHOD FOR CONTROLLING AN AUTONOMOUS MOBILE ROBOT

(71) Applicant: Robart GmbH, Linz (AT)

(72) Inventors: Harold Artes, Linz (AT); Erwin Mascher, Linz (AT); Reinhard Vogel, Linz (AT)

(73) Assignee: Robart GmbH, Linz (AT)

( * ) Notice: Subject to any disclaimer, the term of this patent is extended or adjusted under 35 U.S.C. 154(b) by 10 days.

(21) Appl. No.: 16/077,929

(22) PCT Filed: Feb. 15, 2017

(86) PCT No.: PCT/EP2017/053398
§ 371 (c)(1),
(2) Date: Aug. 14, 2018

(87) PCT Pub. No.: WO2017/140726
PCT Pub. Date: Aug. 24, 2017

(65) Prior Publication Data
US 2019/0094869 A1 Mar. 28, 2019

(30) Foreign Application Priority Data
Feb. 15, 2016 (DE) .......... 10 2016 102 644

(51) Int. Cl.
*G05D 1/02* (2020.01)
*G05D 1/00* (2006.01)

(52) U.S. Cl.
CPC ......... *G05D 1/0219* (2013.01); *G05D 1/0016* (2013.01); *G05D 1/0044* (2013.01);
(Continued)

(58) Field of Classification Search
CPC .. G05D 1/0219; G05D 1/0016; G05D 1/0044; G05D 1/0088; G05D 1/0238;
(Continued)

(56) References Cited

U.S. PATENT DOCUMENTS

| 4,674,048 A | 6/1987 | Okumura |
| 4,777,416 A | 10/1988 | George, II et al. |

(Continued)

FOREIGN PATENT DOCUMENTS

| CA | 2322419 | 9/1999 |
| CN | 101972129 | 2/2011 |

(Continued)

OTHER PUBLICATIONS

Neto et al., Human-Machine Interface Based on Electro-Biological Signals for Mobile Vehicles, 2006, IEEE, p. 2954-2959 (Year: 2006).*

(Continued)

*Primary Examiner* — McDieunel Marc
(74) *Attorney, Agent, or Firm* — Akerman LLP; Peter A. Chiabotti (57) ABSTRACT

A method for controlling an autonomous mobile robot for carrying out a task in a local region of an area of application of the robot. According to one embodiment, the method comprises the following steps: positioning the robot in starting position within the area of application of the robot; detecting information relating to the surroundings of the robot by means of at least one sensor; selecting a region with a determined geometric basic shape; and automatically determining, based on the detected information relating to the surroundings, at least one of the two following parameters: size and position (also including the orientation/alignment) of the selected region.

25 Claims, 7 Drawing Sheets

(52) U.S. Cl.
CPC ......... G05D 1/0088 (2013.01); G05D 1/0238 (2013.01); G05D 1/0274 (2013.01); G05D 2201/0203 (2013.01)

(58) Field of Classification Search
CPC ......... G05D 1/0274; G05D 2201/0203; G05D 15/02; G08G 1/04; A47L 5/14; A47L 11/34
See application file for complete search history.

(56) References Cited

U.S. PATENT DOCUMENTS

| | | | |
|---|---|---|---|
| 5,109,566 A | 5/1992 | Kobayashi et al. | |
| 5,284,522 A | 2/1994 | Kobayashi et al. | |
| 5,377,106 A | 12/1994 | Drunk et al. | |
| 5,696,675 A | 12/1997 | Nakamura et al. | |
| 5,787,545 A | 8/1998 | Colens | |
| 5,995,884 A | 11/1999 | Allen et al. | |
| 6,366,219 B1 * | 4/2002 | Hoummady | G08G 1/04 340/907 |
| 6,389,329 B1 | 5/2002 | Colens | |
| 6,532,404 B2 | 3/2003 | Colens | |
| 6,594,844 B2 | 7/2003 | Jones | |
| 6,605,156 B1 | 8/2003 | Clark et al. | |
| 6,615,108 B1 | 9/2003 | Peless et al. | |
| 6,667,592 B2 | 12/2003 | Jacobs et al. | |
| 6,690,134 B1 | 2/2004 | Jones et al. | |
| 6,764,373 B1 | 7/2004 | Osawa et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 6,972,834 B1 | 12/2005 | Oka et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,483,151 B2 | 1/2009 | Zganec et al. | |
| 7,507,948 B2 | 3/2009 | Park et al. | |
| 7,539,557 B2 | 5/2009 | Yamauchi | |
| 7,571,511 B2 | 8/2009 | Jones et al. | |
| 7,636,982 B2 | 12/2009 | Jones et al. | |
| 7,656,541 B2 | 2/2010 | Waslowski et al. | |
| 7,761,954 B2 | 7/2010 | Ziegler et al. | |
| 8,438,695 B2 * | 5/2013 | Gilbert, Jr. | A47L 11/34 15/319 |
| 8,739,355 B2 * | 6/2014 | Morse | A47L 5/14 15/319 |
| 8,892,251 B1 | 11/2014 | Dooley et al. | |
| 8,982,217 B1 | 3/2015 | Hickman | |
| 9,002,511 B1 | 4/2015 | Hickerson et al. | |
| 9,037,294 B2 | 5/2015 | Chung et al. | |
| 9,043,017 B2 | 5/2015 | Jung et al. | |
| 9,149,170 B2 | 10/2015 | Ozick et al. | |
| 9,220,386 B2 | 12/2015 | Gilbert, Jr. et al. | |
| 2002/0016649 A1 | 2/2002 | Jones | |
| 2002/0120364 A1 | 8/2002 | Colens | |
| 2003/0025472 A1 | 2/2003 | Jones et al. | |
| 2003/0030398 A1 | 2/2003 | Jacobs et al. | |
| 2003/0142925 A1 | 7/2003 | Melchior et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0000543 A1 | 1/2005 | Taylor et al. | |
| 2005/0010331 A1 | 1/2005 | Taylor et al. | |
| 2005/0041839 A1 | 2/2005 | Saitou et al. | |
| 2005/0067994 A1 | 3/2005 | Jones et al. | |
| 2005/0156562 A1 | 7/2005 | Cohen | |
| 2005/0171636 A1 | 8/2005 | Tani | |
| 2005/0204717 A1 | 9/2005 | Colens | |
| 2006/0020369 A1 | 1/2006 | Taylor | |
| 2006/0095158 A1 | 5/2006 | Lee et al. | |
| 2006/0237634 A1 | 10/2006 | Kim | |
| 2007/0061041 A1 | 3/2007 | Zweig | |
| 2007/0266508 A1 | 11/2007 | Jones et al. | |
| 2007/0282484 A1 | 12/2007 | Chung et al. | |
| 2008/0046125 A1 | 2/2008 | Myeong et al. | |
| 2008/0140255 A1 | 6/2008 | Ziegler et al. | |
| 2008/0155768 A1 | 7/2008 | Ziegler et al. | |
| 2008/0192256 A1 | 8/2008 | Wolf et al. | |
| 2008/0307590 A1 | 12/2008 | Jones et al. | |
| 2009/0048727 A1 | 2/2009 | Hong et al. | |
| 2009/0051921 A1 | 2/2009 | Masahiko | |
| 2009/0177320 A1 | 7/2009 | Lee et al. | |
| 2009/0182464 A1 | 7/2009 | Myeong et al. | |
| 2009/0281661 A1 | 11/2009 | Dooley et al. | |
| 2010/0030380 A1 | 2/2010 | Shah et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0324731 A1 | 12/2010 | Letsky | |
| 2010/0324736 A1 | 12/2010 | Yoo et al. | |
| 2011/0137461 A1 | 6/2011 | Kong et al. | |
| 2011/0194755 A1 | 8/2011 | Jeong et al. | |
| 2011/0211731 A1 | 9/2011 | Lee et al. | |
| 2011/0224824 A1 | 9/2011 | Lee et al. | |
| 2011/0238214 A1 | 9/2011 | Yoo et al. | |
| 2011/0264305 A1 | 10/2011 | Choe et al. | |
| 2011/0278082 A1 | 11/2011 | Chung et al. | |
| 2012/0013907 A1 | 1/2012 | Jung et al. | |
| 2012/0022785 A1 | 1/2012 | DiBernardo et al. | |
| 2012/0060320 A1 | 3/2012 | Lee et al. | |
| 2012/0069457 A1 | 3/2012 | Wolf et al. | |
| 2012/0215380 A1 | 8/2012 | Fouillade et al. | |
| 2012/0265370 A1 | 10/2012 | Kim et al. | |
| 2013/0024025 A1 | 1/2013 | Hsu | |
| 2013/0206177 A1 | 8/2013 | Burlutskiy | |
| 2013/0221908 A1 | 8/2013 | Tang | |
| 2013/0265562 A1 | 10/2013 | Tang et al. | |
| 2013/0317944 A1 | 11/2013 | Huang et al. | |
| 2014/0005933 A1 | 1/2014 | Fong et al. | |
| 2014/0098218 A1 | 4/2014 | Wu et al. | |
| 2014/0100693 A1 | 4/2014 | Fong et al. | |
| 2014/0115797 A1 | 5/2014 | Duenne | |
| 2014/0124004 A1 | 5/2014 | Rosenstein et al. | |
| 2014/0156125 A1 | 6/2014 | Song et al. | |
| 2014/0207280 A1 | 7/2014 | Duffley et al. | |
| 2014/0207281 A1 | 7/2014 | Angle et al. | |
| 2014/0207282 A1 * | 7/2014 | Angle | G05B 15/02 700/257 |
| 2014/0218517 A1 | 8/2014 | Kim et al. | |
| 2014/0257563 A1 | 9/2014 | Park et al. | |
| 2014/0257564 A1 | 9/2014 | Sun et al. | |
| 2014/0257565 A1 | 9/2014 | Sun et al. | |
| 2014/0303775 A1 | 10/2014 | Oh et al. | |
| 2014/0316636 A1 | 10/2014 | Hong et al. | |
| 2014/0324270 A1 | 10/2014 | Chan et al. | |
| 2014/0343783 A1 | 11/2014 | Lee | |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1 * | 7/2015 | Artes | G05D 1/0219 701/2 |
| 2015/0223659 A1 | 8/2015 | Han et al. | |
| 2015/0260829 A1 | 9/2015 | Wada | |
| 2016/0037983 A1 | 2/2016 | Hillen et al. | |
| 2016/0103451 A1 | 4/2016 | Vicenti | |
| 2016/0132056 A1 | 5/2016 | Yoshino | |
| 2016/0150933 A1 | 6/2016 | Duenne et al. | |
| 2016/0213218 A1 | 7/2016 | Ham et al. | |
| 2016/0229060 A1 | 8/2016 | Kim et al. | |
| 2016/0282873 A1 | 9/2016 | Masaki et al. | |
| 2017/0083022 A1 | 3/2017 | Tang | |
| 2017/0147000 A1 | 5/2017 | Hoennige et al. | |
| 2017/0177001 A1 | 6/2017 | Cao et al. | |

(56) References Cited

U.S. PATENT DOCUMENTS

| | | |
|---|---|---|
| 2017/0197314 A1 | 7/2017 | Stout et al. |
| 2017/0231452 A1 | 8/2017 | Saito et al. |
| 2017/0364087 A1 | 12/2017 | Tang et al. |

FOREIGN PATENT DOCUMENTS

| | | |
|---|---|---|
| CN | 102407522 | 4/2012 |
| CN | 203672362 | 6/2014 |
| CN | 104460663 | 3/2015 |
| CN | 104765362 | 7/2015 |
| CN | 105334847 | 2/2016 |
| CN | 105467398 | 4/2016 |
| CN | 105527619 | 4/2016 |
| CN | 105990876 | 10/2016 |
| DE | 10204223 | 8/2003 |
| DE | 60002209 | 3/2004 |
| DE | 102007016802 | 5/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102011050357 | 2/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102013104399 | 10/2014 |
| DE | 102013104547 | 11/2014 |
| DE | 102014012811 | 10/2015 |
| EP | 0142594 | 5/1985 |
| EP | 0402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2502539 | 9/2012 |
| EP | 2511782 | 10/2012 |
| EP | 2573639 | 3/2013 |
| EP | 2595024 | 5/2013 |
| EP | 2740013 | 6/2014 |
| EP | 2741159 | 6/2014 |
| EP | 2870852 | 5/2015 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2005205028 | 8/2005 |
| JP | 2013146302 | 8/2013 |
| JP | 2014176260 | 9/2014 |
| JP | 201541203 | 3/2015 |
| KR | 100735565 | 5/2006 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 99/28800 | 6/1999 |
| WO | 200004430 | 1/2000 |
| WO | 2005074362 | 8/2005 |
| WO | 2007028667 | 3/2007 |
| WO | 2012099694 | 7/2012 |
| WO | 2012157951 | 11/2012 |
| WO | 2014017256 | 1/2014 |
| WO | 2014043732 | 3/2014 |
| WO | 2014055966 | 4/2014 |
| WO | 2014/113091 | 7/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Forlizzi, How robotic products become social products: An ethnographic study of cleaning in the home, 2007, IEEE, p. 129-136 (Year: 2007).*

Everett, "Sensors for mobile robots: theory and application," A. K. Peters, Ltd. Natick, MA, USA, 1995 ISBN-10: 1568810482, document of 543 pages.

Siegwart, "Introduction to Autonomous Mobile Robots", Massachusetts, ISBN 978-0-26-219502-7, (2004), URL: http://www.robotee.com/EBooks/Introduction_to_Autonomous_Mobile_Robots.pdf, XP055054850.

Konolige et al., "A Low-Cost Laser Distance Sensor," 2008 IEEE International Conference on Robotics and Automation, Pasadena, CA, USA, May 19-23, 2008, document of 7 pages.

Oh et al., "Autonomous Battery Recharging for Indoor Mobile Robots", Massachusetts Institute of Technology Press, Aug. 30, 2000, XP055321836.

Thrun et al., "Probabilistic Robotics"; 1999, 492 pages.

Choset et al., "Principles of Robot Motion", Theory, Algorithms, and Implementations, Chapter 6—Cell Decompositions, 2004, document of 41 pages.

Durrant-Whyte et al., "Simultaneous Localization and Mapping (SLAM): Part I The Essential Algorithms", in: IEEE Robotics and Automation Magazine, vol. 13, No. 2, pp. 99-108 Jun. 2006.

Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.2737726.

World Intellectual Property Office, "International Search Report" and English translation thereof, issued in PCT/EP2017053398, dated Jun. 12, 2017; document of 8 pages.

(56) References Cited

OTHER PUBLICATIONS

German Patent Office, "Office Action" issued in German Patent Application No. 10 2016 102 644.1, dated Jan. 16, 2017, document of 11 pages.

* cited by examiner

METHOD FOR CONTROLLING AN AUTONOMOUS MOBILE ROBOT

CROSS REFERENCE TO RELATED APPLICATIONS

This application is a § 371 National Phase of PCT/EP2017/053398, filed Feb. 15, 2017, the entirety of which is incorporated by reference and which claims priority to German Patent Application No. 10 2016 102 644.1, filed Feb. 15, 2016.

TECHNICAL FIELD

This disclosure relates to a mobile autonomous service robot such as, e.g. a robot for processing surfaces (cleaning floors, mowing grass, painting a surface, etc.). In particular, a method for controlling an autonomous mobile service robot in order to localizedly process a given part of the area of robot employment is described.

BACKGROUND

In recent years, autonomous mobile robots are being increasingly employed in the household, for example to clean or to monitor an apartment. In addition to this, service robots such as, for example, the PR2 (Personal Robot 2) from Willow Garage Inc., are being developed that are equipped with gripper arms for independently gripping and transporting objects (for example, for taking a drink from the refrigerator and bringing it to the user). A further example of an autonomous mobile service robot are so-called telepresence robots (Mobile Virtual Presence Devices, Telepresence Robot), that provide information or allow people to communicate over great distances.

One common employment scenario for a service robot is the execution of a task in a relatively small, locally contained area within the area of robot employment (e.g. an apartment), the location of which is indicated by the user. For example, a small cleaning robot may be employed by a user to clean up small dirtied areas such as, for example, crumbs that have fallen on the floor in a given area of the apartment. For this purpose, for example, the user can carry the robot to the dirtied area or direct it there using a remote control. In both cases the user must actively move the robot to the dirtied area.

Various embodiments described aim at providing new methods and improving existing ones for directing an autonomous mobile robot to a given location within a larger area of robot employment in order to execute a task.

SUMMARY

In the following, a method for controlling an autonomous mobile robot for the purpose of executing a task in a localized area of an area of robot employment is described. In accordance with one embodiment, the method comprises: positioning of a robot at a start position within the area of robot employment; detection of information concerning the environment of the robot by means of a sensor; selection of a region of a certain geometric shape; and automatic determination, based on the detected information concerning the environment, of at least one of the following parameters: size and length (includes also the orientation/alignment) of the selected region.

Further, a method is described for controlling an autonomous mobile robot with a navigation module that comprises at least one sensor for navigation and orientation in the environment of the robot by means of at least one electronic map. In accordance with one embodiment, the method comprises: positioning the robot at a starting position within the area of robot employment; carrying out a self-localization, in the course of which the robot determines, by means of at least one sensor and at least one of the electronic maps, whether it is located on at least one of the electronic maps and, if so, at what position; verifying whether a task is linked to the determined robot position or to an area in which the determined robot position lies; and, as the case may be, the execution of the task by the robot.

In accordance with a further embodiment, the method comprises the following: positioning of the robot at a starting position within the area of robot employment; initiating the execution of a standard task by the robot; carrying out a self-localization, in the course of which the robot determines, by means of the at least one sensor and the at least one electronic map, whether it is located on at least one of the electronic maps and, if so, at what position; and verifying whether a task is linked to the determined robot position or to an area in which the determined robot position lies. If, after the robot has ended the self-localization, the determined robot position or an area in which the determined robot position lies is found to be linked to a first task, the standard task will be discontinued and the execution of the first task will be initiated.

Further, a method for controlling an autonomous mobile robot by means of a human-machine interface (HMI) is described, wherein the robot comprises a navigation module with an electronic map and with at least one sensor for navigation and orientation in the environment and wherein the robot and the HMI can exchange data via a communication connection. In accordance with one embodiment, the method comprises: displaying a map on the HMI; the user marking a point on the map; transferring the map coordinates of the marked point to the robot. The robot is then automatically controlled to begin processing a given area that is dependent on the marked point.

Further, a system with an autonomous mobile robot and an external device for wirelessly controlling the autonomous mobile robot is described. In accordance with one embodiment the device is configured to harvest the energy needed for its operation by means of Energy Harvesting.

In accordance with a further embodiment, the external device comprises a switch and a transmission unit and is configured to transmit a coded signal when the switch is actuated. Here the robot is configured to receive a code included in a coded signal, wherein the code determines a given task that is to be carried out in a given localized region of the area of robot employment and wherein the robot, immediately or after a defined delay time following the reception of the coded signal, initiates the execution of the given task in the given localized region.

Finally, a method for controlling an autonomous mobile robot configured as a floor processing machine is described, wherein the autonomous mobile floor processing machine comprises a navigation module that is configured to detect map information regarding the environment of the floor processing machine and, with this information, to localize itself in and to navigate within the environment. The map information may at least partially be displayed on at least one human-machine interface and the floor processing machine is configured to receive at least two different user commands from the at least one human-machine interface. One of the user commands signifies the complete floor processing of an area of employment of the floor processing machine. In accordance with one embodiment, the method comprises the following: deletion of all map information before the start of a complete floor processing; detection of new map information before the start of a complete floor processing; display of the newly detected map information on a human-machine interface; reception of a user command based on the displayed map information; control of the autonomous mobile floor processing machine in correspondence with the user command and the newly detected map information.

BRIEF DESCRIPTION OF THE FIGURES

Various embodiments are described in the following in detail with the aid of the examples illustrated in the figures. The illustrations are not necessarily to scale and the embodiments are not limited to the aspects shown. Instead emphasis is placed on illustrating the underlying principles. The figures show.

DETAILED DESCRIPTION

An autonomous mobile service robot can usually independently carry out one or more tasks such as, for example, the cleaning or monitoring of a household or the transport of objects within a household. The following examples are intended to describe various employment possibilities of a cleaning robot. The embodiments described herein, however, are not limited to the examples explained here, but rather may be generally applicable to all applications, in which a user wants to assign a task, at a user-definable position or within a user-definable region of a larger area of robot employment, to an autonomous mobile robot.

A mobile autonomous robot generally comprises a drive module which, for example, may comprise electromotors, gears and wheels with which the robot—theoretically—can access every point of its area of employment. The robot may further comprise a work module such as, for example, a cleaning module for cleaning a floor surface (i.e. a brush, a vacuum cleaning device, etc.) or a gripper arm for gripping and transporting objects. A mobile autonomous robot configured as a telepresence robot dispenses with the work module and instead of this has at least one multimedia unit with, for example, a microphone, a loudspeaker, a camera and a screen.

In order to be able to autonomously carry out a task, a mobile autonomous robot generally has a navigation module and appropriate sensors, with the aid of which the robot can orient itself in and navigate throughout its environment. The navigation module can implement, e.g. an obstacle avoidance strategy and/or employ a SLAM algorithm (*Simultaneous Localization and Mapping*, see, e.g. Durrant Whyte and T. Baily: "*Simultaneous Localization and Mapping (SLAM): Part I The Essential Algorithms*", in: IEEE Robotics and Automation Magazine, Vol. 13, No. 2, pgs. 99-110, June 2006). For this purpose, one or more maps of the area of robot employment can be stored in the robot. The robot may compile the map of the area of robot employment anew or may use an existing map that is already present at the start of its employment. An existing map may have been compiled during a previous employment, for example during an exploratory run, by the robot itself, or it may have been made available by another robot and/or the user. A sensor that is suitable for orienting and navigating the robot is, for example, a sensor that is configured to measure distances to objects in the environment such as, for example, an optical and/or acoustic sensor that operates, e.g. by means of triangulation or travel time measurement of an emitted signal (e.g. triangulation sensor, time-of-flight camera, laser scanner, ultrasonic sensors, etc.). Other typical examples of suitable sensors are cameras (together with digital image processing), tactile sensors, acceleration sensors, gyroscopes or odometers).

The software responsible for the behavior of the robot can be run entirely on the robot (in corresponding processor and storage element) or may be at least partially outsourced onto an external computer that is accessible, for example, in a home network or via the internet (cloud).

Figure 1:
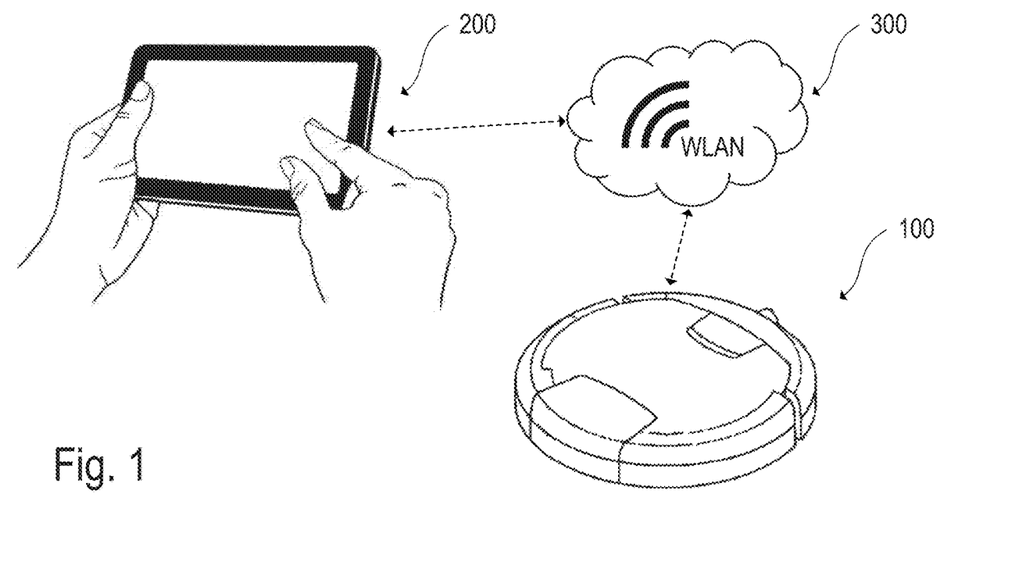
FIG. 1 shows schematically an autonomous mobile robot and a mobile device for operating the robot.
Figure 2:
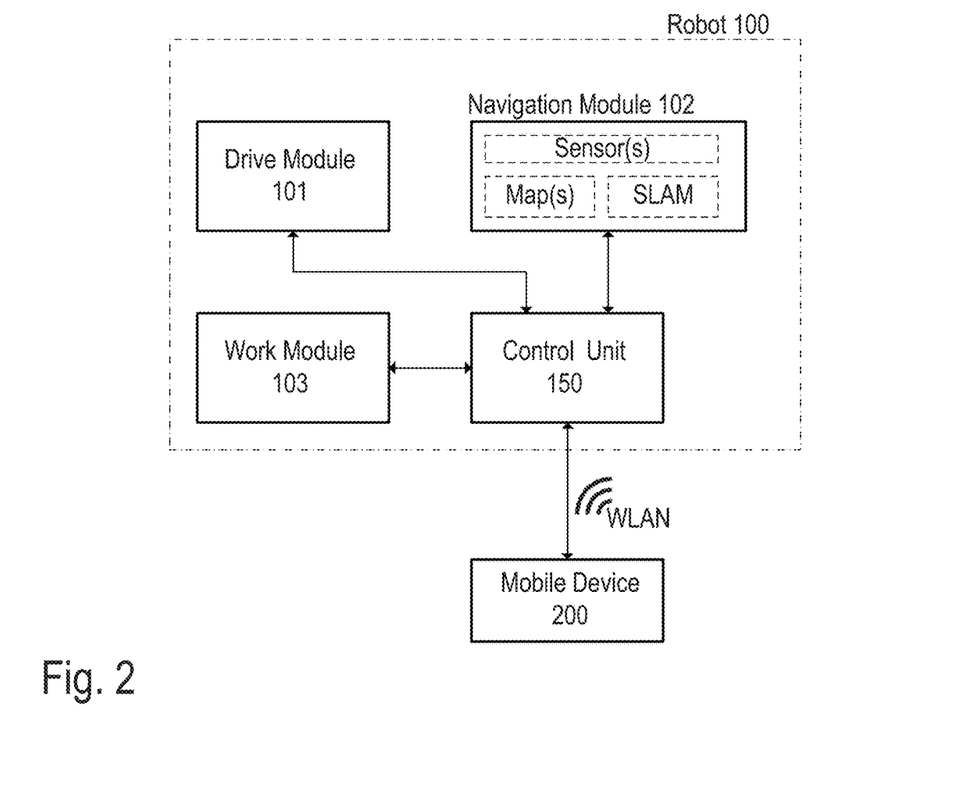
FIG. 2 shows with the aid of a block diagram the various modules of a robot.

As is shown in FIG. 1, the control of an autonomous mobile service robot 100 can be realized, for example, with the aid of an external mobile device 200 such as, e.g. a smart watch, a smart phone, a (smart) television or a tablet PC. The mobile device communicates with the robot, for example, wirelessly via a home network 300 (e.g. via a wireless network in accordance with the IEEE 802.11 standard or the similar). FIG. 2 illustrates, by means of a block circuit diagram, the module of a service robot 100 mentioned above. In the example shown, the robot 100 comprises a drive module 101 (e.g. with motor, gears, etc.), a navigation module 102 (e.g. with sensors, electronic maps, a SLAM function, etc.), a work module 103 (e.g. with brushes, a vacuuming unit, etc.), as well as a central control unit 150. The control unit 150 generally comprises a microprocessor for executing process instructions that determine the behavior of the robot. In particular, the control unit 150 controls the operation of the drive module 101, the navigation module 102 and the work module 103, and is configured, e.g. to communicate via the wireless network 300 with a mobile device that allows for interaction with the user. The modules 101, 102, 103 should only be regarded as functional units and not necessarily as spatially separate components. The construction and functionality of the mentioned units are as such well known and therefore not explained here in detail.

Figures 3A, 3B:
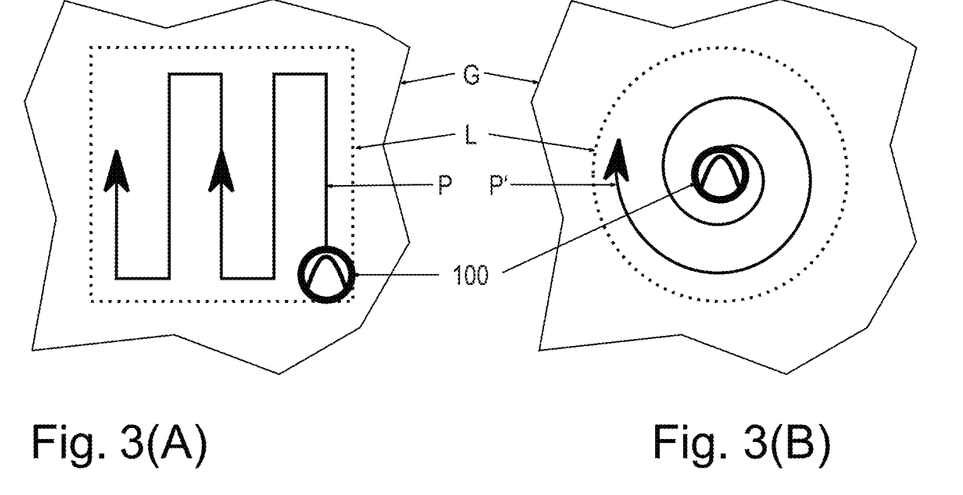
FIG. 3 illustrates schematically a method for cleaning a dirtied area in a locally delimited region of a larger area of robot employment.

FIG. 3 shows two examples of methods for having a dirtied area in a locally delimited region within a larger area of robot employment G cleaned by a robot 100. For this, the robot 100 is positioned by its user at a (theoretically) freely selectable location of the area of robot employment G in the proximity of the dirtied area to be cleaned. This may be carried out, for example, by the user carrying the robot to the location or by means of movement commands that are manually input by the user and that are generated, for example, by pressing direction buttons on an external device (e.g. remote control, smartphone, etc.). After having received a user input (for example, by the user pressing a button on the robot), the robot 100, starting from its present position, cleans a previously defined region L that is determined by the position of the robot in regular paths. The previously defined (standard) region L is, for example, a simple geometric shape of a defined size such as, for example, a square (see FIG. 3A), a circle (see FIG. 3B), a rectangle or another regular polygon. The position of the region L to be cleaned is determined by the robot position (as determined by the user and including the orientation) at which the robot is placed by the user. This position is, for example, a boundary point (in particular a corner) (see FIG. 3A) or the center point (see FIG. 3B) of the standardized region L.

The processing of the standardized region L can be carried out, for example, along a meandering path P (see FIG. 3A) or along a spiral path P' (see FIG. 3B), whereas the spiral pattern may also be angularly shaped, e.g. in order to allow for the cleaning of a quadratic area. The cleaning may also be carried out along a path corresponding to any other desired pattern. For example, a cleaning strategy may consist in cleaning along a random/chaotic path within the standardized region L. After cleaning the standardized region L, the robot 100 can return to its starting point, for example, by heading directly to a starting point from which it had previously departed or while carrying out a second cleaning in accordance with a suitably chosen cleaning pattern. The approaches described with reference to FIG. 3 have the disadvantage of being quite inflexible. Thus, for example, in the case of regions to be cleaned which are of differing sizes, a user input is needed in order to be able to adapt the size of the region L to be cleaned.

In order to improve the practical utility for the user, it is desirable for the modi of operation for the cleaning a locally existing dirtied area by an autonomous mobile robot described with reference to FIG. 3 to be rendered more "intelligent". For this purpose, the robot 100 can detect its environment by means of suitable sensors and, based on the data detected by the sensors, automatically adapt the standardized region L, for example, by rotating, shifting and/or expanding. A further possibility for adapting the standardized region L is to automatically begin this cleaning modus for the cleaning of a locally existing dirtied area anew from a starting point that is automatically determined based on the data detected by the sensors.

"Intelligent" automatic adaptation to the environment: FIG. 4 shows an example in which the robot is to clean a heavily dirtied area D in a locally delimited region. When doing so, the standardized region L (cf. FIG. 3) should be dynamically adapted to as to be able to clean the dirtied area D as completely as possible in one run. For this purpose the robot 100 has, for example, a dirt sensor that recognizes the dirt D lying on the floor (e.g. a camera), or that detects the amount of dirt collected. Such sensors are generally well known and are based, for example, on an optical detection of the light dispersed from the dirt particles collected (e.g. by means of a brush or vacuuming) or on a detection of mechanical (e.g. acoustic) oscillations produced by the encountered dirt particles. Using such a dirt sensor, the robot can determine the distribution of the dirt on the floor during the cleaning process. Based on this measured distribution, the robot 100 can shift or scale (or both) the borders of the standardized region L, automatically determining an adapted region L'. This is particularly done during the cleaning run or after the standardized region L has been travelled over completely at least once.

Figure 4A:
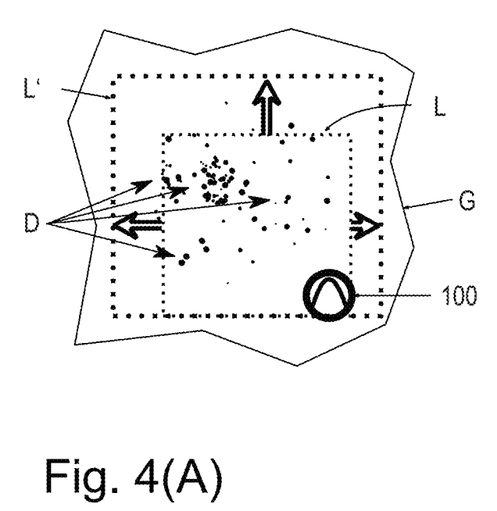
FIG. 4 illustrates the automatic "intelligent" adaptation of a locally delimited region to be cleaned to a measured distribution of dirt.

In the example shown in FIG. 4A, the borders of the standardized region L are adapted so that the coarsely dirtied area D is encompassed by the adapted region L' as completely as possible. For this purpose, for example, during the cleaning of the standardized region L the borders of the region L are shifted to the point at which a segment of a (e.g. meandering) cleaning path can be travelled through without a significant collection of dirt. The advantage of this approach is that the borders of the adapted region L' can be determined during the cleaning process itself by deciding, based on currently detected sensor data, whether the current cleaning path should be continued and, if so, how, for example by attaching a further partially linear path segment to the meandering path.

As an alternative, a mathematic distribution model can be determined that represents or approximates the (actual, as determined by the sensors) distribution of dirt within the standardized region L. For example, it can be assumed that the dirt (2D) is normally distributed. Such a normal distribution is defined by its maximum (average value) and its width (standard deviation). By determining the most heavily dirtied spot in the region L, the average value of the distribution can be estimated. Using the spatial change of distribution beginning at the most heavily dirtied spot, the standard deviation (within the region L) can also be estimated. Based on the thus determined mathematical distribution model, the amount and distribution of the dirt outside of the region L can be estimated, and based on this the borders of the adapted region L', for example, can be determined such that the probability of a dirtied area lying outside of the thus defined region L' is smaller than a threshold value (that is, for example, smaller than 1%). In addition to the normal distribution, any other stochastic distribution module may be used to formulate a mathematical model of the dirt distribution. In an alternative embodiment, the distribution and amount of the dirt outside of the region L is estimated by extrapolating the actual distribution of the dirt within the region L as determined with the aid of (at least) one dirt sensor.

Figure 4B:
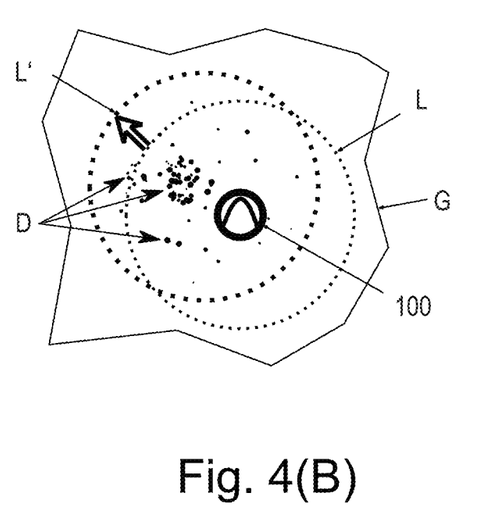

In the example shown in FIG. 4B, the entire (in the present case, circular) standardized region L is shifted until the maximum of the dirtied area D lies approximately at the center point of the shifted (and, if needed, scaled) region L. In this regard it is to be noted that shifting the standardized region L is only expedient as long as the starting point (set by the user) continues to lie within the shifted region L'. In order to ensure this, the shifted region L' can be, for example, expanded as well.

Alternatively, the standardized region L may also be first completely cleaned. Based on the sensor measurements the cleaning process is repeated, wherein during the repetition the shifted region L' is cleaned. This is determined, for example, such that the maximum of the dirt (that was cleaned during the first cleaning run) lies at the center point of the shifted region L'. This procedure can be iteratively repeated as needed, wherein the sensor data of the directly preceding cleaning or that of all preceding cleanings can be taken into consideration.

Figure 5A:
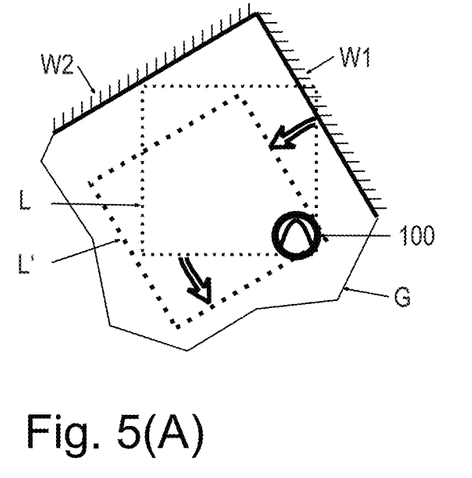
FIG. 5 illustrates the automatic "intelligent" adaptation of a locally delimited area to be cleaned to one or more neighboring walls.
Figure 5B:
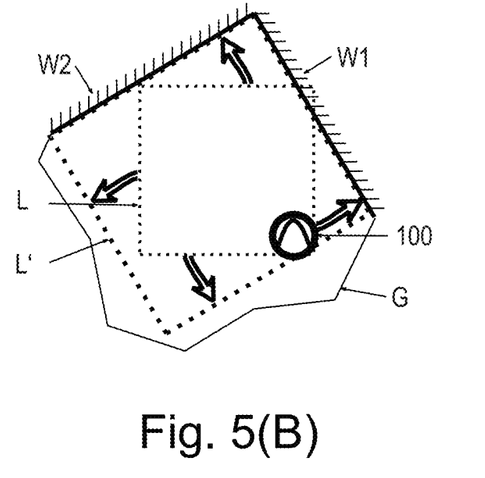

FIG. 5 shows an example in which the robot 100 is to clean near a corner (defined by two walls W1 and W2 of a room). When doing so, the robot 100 detects the wall W1 and W2 with an obstacle detection sensor such as, for example, a triangulation sensor for measuring distances that is also used for navigation and to compile the map (e.g. by means of SLAM, cf. FIG. 2). In a simple exemplary embodiment (FIG. 5A), the robot rotates the standardized region L around its starting position in order to obtain a modified region to be cleaned L' that is aligned parallel to the closest wall W1. In the present example in accordance with FIG. 5A, however, a relatively small area is left between wall W1 and the modified region L'. Because of the fact that dirt often gathers along walls, it may be expedient to extend the modified region L' up to a wall. FIG. 5B shows an example in which the region to be cleaned L' has been extended in a first direction up to the wall W1 and in a second direction up to the wall W2, whereas the shape of the area is kept quadratic. In an alternative example, the region L' is rectangular, wherein two sides are formed by the walls W1 and W2 and the two other sides, for example, by the corner points of the original standardized region L.

The decision as to whether the standardized region L should be aligned with a wall and, if so, then how, can be made, for example, based on the distance of the starting position of the robot to the closest wall and/or the distances of the border points of the standardized region L to the surrounding walls. In the example of FIG. 5, the standardized region L intersects the wall W1 and therefore an alignment along this wall is carried out. In addition, for example, the orientation of the robot in relation to a close wall can be considered. If, for example, (at least) one side of the standardized region L (as extrapolated from the position and orientation of the robot) is nearly parallel or nearly perpendicular to a nearby obstacle (e.g. at an angular deviation of less than 10°), it may be assumed that a user had intended a corresponding alignment and the standardized region is aligned along the respective wall.

In addition to adapting the standardized region L based on the data gathered by the sensors, the robot can also adapt the basic geometric shape of the standardized region L to the spatial conditions of the environment surrounding the starting point specified by the user. Thus, for example, (with the aid of sensors) the robot can recognize that it has been placed near a wall and/or a corner of the room. In this case, a standardized region L with a basic quadratic or rectangular shape is chosen and this basic shape of the region to be cleaned L is modified by adapting it to the wall and/or the corner, as described above. If, in an opposing case, the robot is placed in a large open area (e.g. in the middle of a room) and there is no immediately apparent preferred direction in which to align it, e.g. a square, then the geometric shape chosen for a region L may be a circle. This region L can then be modified, for example, as described with referenced to FIG. 4B.

Numerous further examples in which the user's work is made easier by automatically adapting a region L for the localized cleaning of a floor surface are possible. The robot, for example, can be equipped with a sensor for recognizing floor coverings and can adapt the standardized region L based on these measurements. Thus the robot can be placed by a user onto a carpet in order to specifically clean the same. The region L can then be aligned, e.g. along the borders of the carpet, analogously to the alignment along a wall described above.

The robot may have, e.g. a sensor directed at the ceiling, such as, e.g. a camera. With such a sensor the robot can detect, e.g. whether it has been placed near a piece of furniture that it can move under. In this case, the robot can adapt the standardized region L based on these measurements. Thus the robot can be placed by the user, for example, directly in front of a bed (i.e. no further than a maximum distance from the bed) in order to specifically clean underneath this bed. The region L will then be adapted to the dimensions of the bed.

Further, the robot can be configured to recognize a table with chairs (dinette). If a table with chairs (group of furniture) is detected, the standardized region L can be adapted to the group of furniture. The robot can chose, e.g. based on the recognized obstacles (in particular the legs of tables and chairs), the region to be cleaned so as to be large enough so that, for example, an area around the group of furniture (i.e. the table and all the chairs) equivalent to at least one width of the robot is cleaned. For this purpose, for example, as the region to be cleaned L', a rectangle is chosen that completely encompasses the group of furniture. The orientation of the rectangle can be determined based on how the group of furniture and/or nearby walls is(are) aligned. The borders of the rectangle are determined, for example, such that the minimum distance to a table or chair leg corresponds to that of at least one robot diameter. Thus a user, for example, after breakfast, may place the robot next to the breakfast table to clean up crumbs that have fallen to the floor. Recognition is carried out, for example, with a camera that uses image processing or based on the numerous small but regularly occurring obstacles formed by the legs of the table and chairs.

Further, the robot may be placed by the user, for example, near the door of a room, as a result of which the standardized region L would comprise two rooms. The robot then adapts the region to be cleaned such that it lies completely within one room. At the end of the cleaning the robot (with or without consulting the user) can adapt the region L again such that it lies completely within the other room.

The robot can also be configured to choose, based on the newly formed geometric shape of the region to be cleaned L', a suitable cleaning pattern. For example, for a small round or square region L', a spiral path P (cf. FIG. 3B) may be chosen, whereas in a large rectangular region a meandering path (cf. FIG. 3A) is followed that, for example, runs parallel to the longest edge of the rectangular region.

The robot may have a map of the area of robot employment available by means of which it can localize itself. In this case, in addition to the information received from the sensors, information from the map can also be used to modify the region L to be processed and to adapt it to the conditions in the proximity of the starting point. In particular, the robot can take into consideration and avoid danger zones, either those it had previously identified or that were designated as such by the user. Alternatively, it is possible to carry out adaptations, for example, by automatically selecting basic, previously specified shapes and sizes for the region to be cleaned based on the sensor measurements (of the navigation module sensors). When the region to be cleaned L' is determined, requests can be made regarding a specifiable extent of the processing (e.g. the surface area to be cleaned, the duration of the cleaning). Thus, for example, it can be requested that at least one square meter be cleaned in order to achieve a significant cleaning result. A further request may be that the expected cleaning duration should not exceed a specifiable time, for example, 10 minutes. The requests regarding an extent of the processing (in particular minimum and maximum) can be specified, for example, by the user.

Figure 6A:
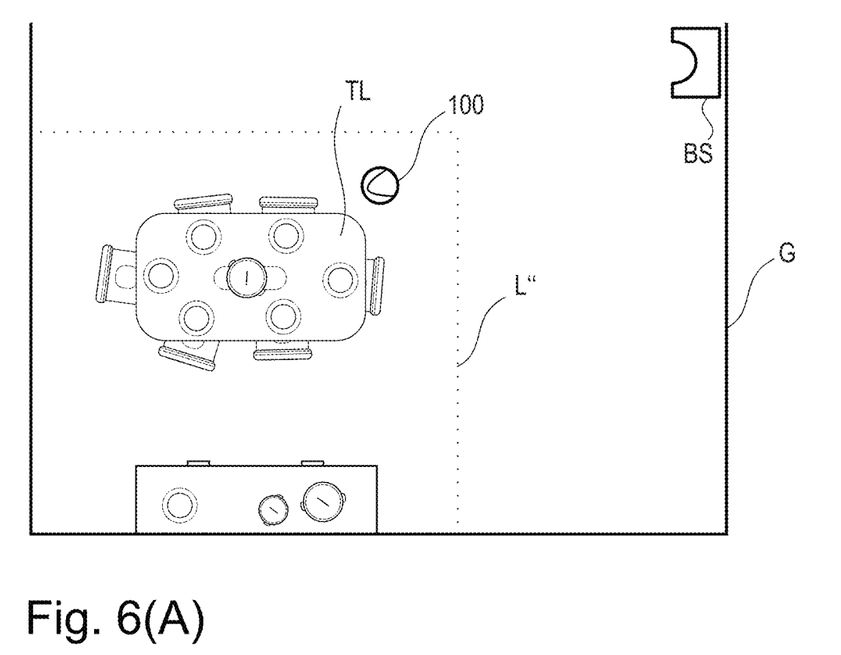
FIG. 6 illustrates the cleaning of an area surrounding a group of furniture consisting of a table and several chairs.
Figure 6B:
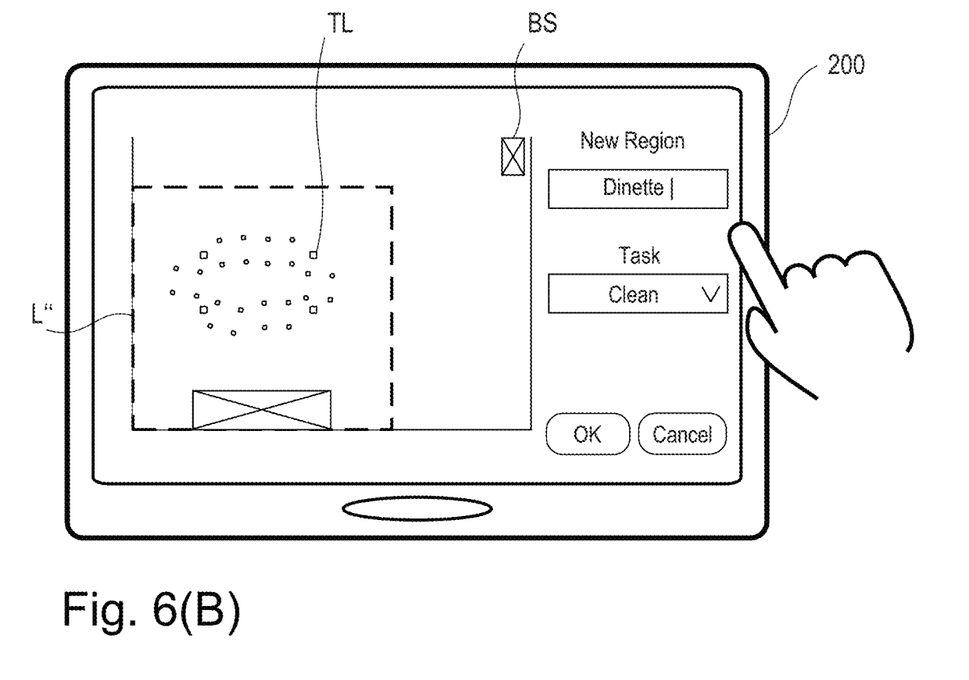

Localization and returning home: One desirable function of service robots in a household is the ability to carry out regularly occurring tasks such as, for example, the cleaning of a quickly dirtied area (e.g. the floor of a dinette) without, however, having to clean the entire room or the complete apartment. The transport of used dishes, e.g. from the table in a dinette to a dishwashing machine, for example, may be one of these regularly occurring tasks. The relevant literature describes as solutions for such problems robot systems that have a permanent map of the area of robot employment. This map can be compiled by the robot itself or may otherwise be made available. The user can have the electronic map of the area of robot employment displayed to him on a human-machine interface (e.g. a tablet PC 200, cf. FIG. 1) and can control and monitor the robot with the aid of this map. For example, the user can define standard operating areas by selecting, either manually or automatedly, subsections of the map and saving these, thus making it possible to select at any time a saved subsection for cleaning. For example, the user may thus select on the map a "dinette" with table and chairs and a suitable area surrounding it as standardized region L" and permanently save it (see FIGS. 6A and 6B). Then, after a meal, for example, the user can quickly instruct the robot to clean up any crumbs that may have fallen to the floor.

Some users may find it inconvenient to first, e.g. look for the tablet PC and then to turn it on in order to instruct the robot to clean up a small dirtied area when they could simply carry the robot to the dirtied area and start it in less time. Furthermore, situations may arise in which the robot in unable to move directly to the area to be processed, such as when, for example, it is employed in a house having two or more floors and it cannot independently move from one floor to the next. In this case as well the user must relocate the robot manually and, at the same time, the user can carry the robot directly to the area to be processed and start it. In such situations is may be advantageous for the robot to independently recognize, after having been positioned and started by the user, that a previously defined standard operating region exists for its position. For example, the user places the robot next to a table leg TL (see FIGS. 6A and 6B) belonging to the table of the previously defined standard operating region "dinette" (region L", see FIG. 6A) and, by pressing a button (e.g. arranged directly on the housing of the robot), starts the cleaning program to clean up a nearby dirtied area. After this start, the robot 100 begins to determine its position with the aid of its map and with that of characteristics in its environment that it has recognized by means of (at least) one sensor (global localization). Thus, using its sensor the robot can recognize, for example, the table with chairs and a nearby wall and in this manner can determine that it is located in the standard operating region L", defined as "dinette". This (global) localization can be carried out before the robot 100 begins the actual cleaning, in order to directly clean a recognized, previously defined standard operating region L". If the robot 100 is not located in a standard operating region, then it cleans a standardized region L (which can additionally be modified as described above with reference to FIGS. 4 and 5).

In order to accelerate the cleaning process, the robot can also begin cleaning a standardized region L (or a modified standardized region L', cf. FIGS. 4 and 5) and, parallel to this, can determine its position on the map. As soon as the robot has localized itself, the standardized region L' can be enlarged to the standard operating region "dinette" (region L", see FIG. 6).

A localization of the robot 100 on an existing map of the area of robot employment also enable the robot 100 to verify with the map (cf. FIG. 6A) whether an (accessible) base station BS of the robot 100 is designated on it. Thus, after completing its task, the robot can automatically verify whether a base station is accessible without, for example, having previously detected it with a sensor. This is particularly relevant when the base station is in a room other than the one in which the robot was placed by the user. If there is no accessible base station, the robot returns to the position at which the user had previously placed it. If, however, a base station is accessible, then it can automatically move to it, for example, in order to recharge its battery or to dispose of collected dirt.

A localization of the robot 100 on an existing map of the area of robot employment also enables the robot 100 to recognize, using the map, previously identified danger zones in its environment and/or those that have been marked on a map by the user. These can be taken into account when determining the area to be cleaned and can be particularly avoided. Such a danger zone might be, for example, an area in which the robot regularly becomes stuck and can only be liberated by means of intervention by the user. It may also be an area, however, that the user does not want the robot to enter because it contains, for example, items of furniture that are very fragile or because small parts of toys might frequently be lying around in the area.

A localization of the robot 100 on an existing map of the area of robot employment also enables the robot 100 to display, during and/or after the cleaning, both the region to be cleaned (e.g. region L' as according to FIG. 5), as well as the cleaning results, on a human-machine interface (e.g. a tablet PC 200, see FIG. 1). Thus the user can additionally be afforded the possibility of permanently saving the cleaned region as a standard operating region (cf. region L" as according to FIG. 6) in order to quickly select it for future operative tasks (as described above). This allows, in particular in combination with the automatic adaptation of a standardized region L to its environment as described above with reference to FIGS. 4 and 5, for such standardized regions L" to be automatically created in a simple, uncomplicated manner.

Finally, a localization of the robot on an existing map of the area of robot employment enables the robot to automatically save the position of the regions for localized cleaning (region L' in accordance with FIG. 4 or 5 or region L" in accordance with FIG. 6). If a user regularly selects such a region for cleaning, this indicates that is more frequently dirtied during daily activities. During a regular cleaning, then, the robot may clean especially thoroughly, for example, by going over and cleaning the area two times or more or, for example, by increasing the vacuuming strength.

Quick start by pressing a button: In order to process a previously defined and saved standard operating region L" (see FIG. 6) more easily, the user, for example, can set up rapid access (a so-called "Quick Link") on the user display (home screen or desktop) of a programmable human-machine interface (e.g. tablet PC, smartphone, smartwatch, (smart) TV, computer) which, by being pressed once, instructs the robot to process a specified standard operating region L".

Figure 7:
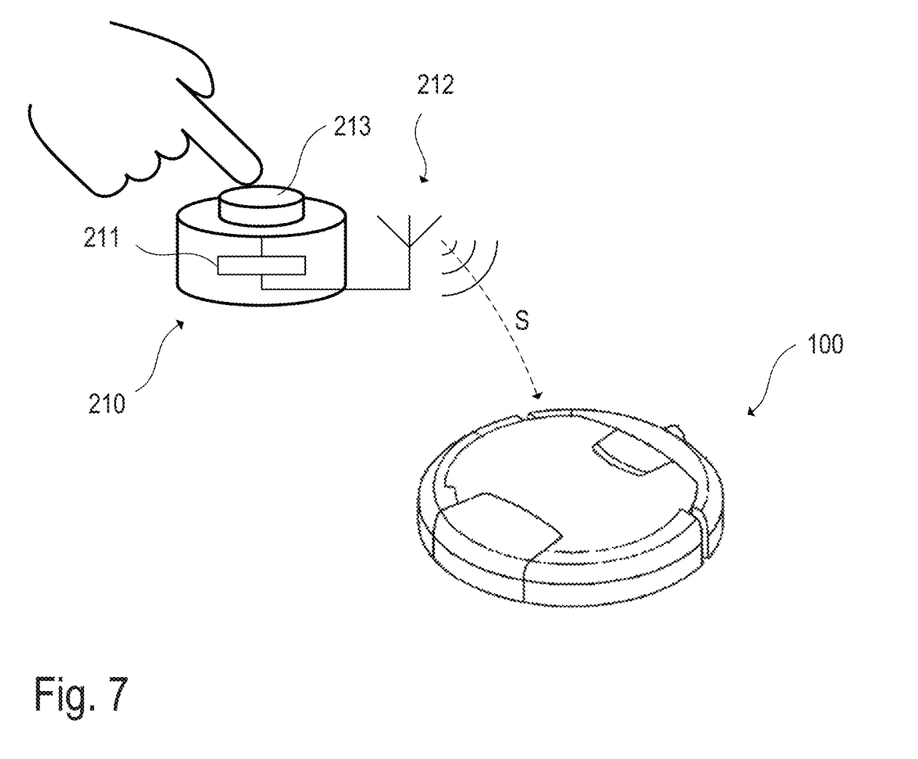
FIG. 7 shows schematically an external device that is connected via radio with the robot and that has a button for starting the robot so that it carries out a given operation in a locally delimited region of the area of robot employment.

In a further embodiment a robot-external device is used that is configured, for example, to wirelessly transmit a signal to the robot when a user presses a button or when another event takes place. One example is shown in FIG. 7. FIG. 7 shows the external device 210 that contains, in a compact housing, only one button 213, as well as an electronic system (including energy supply) that is configured to generate a radio signal S that is emitted by an antenna 212 when the button 213 is actuated. The robot 100 can be constructed such that it reacts to this signal by carrying out a specified activity in a specified (localized) standard operating region L". The user can place (e.g. attach) this device

210, for example, in the proximity of the area of employment such as, for example, a dining table or in any other conveniently accessible place in order to quickly activate the robot when needed (for example, after a meal). In this manner, a cleaning robot can be quickly activated in order to clean, e.g. a region L" around the dining table (cf. FIG. 6). In the same manner a transport robot, for example, can also be instructed to carry used dishes from the dining table to a dishwashing machine, etc. The button may also be realized as a contact switch in order to register, for example, the opening and/or closing of a (house) door, window, drawer or cat flap as an event. Thus, for example, the robot 100 can be configured to clean the entrance way around the house door when it receives a signal S that was triggered by a contact switch connected with the house door. This can take place after a specifiable time delay so that a user who has just entered the apartment has enough time to leave the entrance way and thus will not be disturbed by the robot.

Such an external device 210 can be realized simply and at minimal expense. It needs an energy supply (in the electronic system), a switch 213 (e.g. a button), which is actuated upon a given event and a transmission unit (in the electronic system 211) for generating a radio signal to send the signal S to the robot 100 after the switch has detected the event. The energy supply can be a battery. Alternatively, the needed energy can be derived from the environment and/or the event to be detected (Energy Harvesting). In particular, the needed energy can be derived from the mechanical labor exerted when the switch (button) is actuated. Accordingly, for example, the switch will be linked with a piezoelectric element that derives the energy needed to send the signal to the robot from the pressing of the button by the user. The switch 213 can be embodied as a simple button switch or contact switch that is triggered by being pressed by the user or by the opening and/or closing of a door. The transmission unit can emit an electromagnetic signal corresponding to a standard used in wireless networks, such as ZigBee, WiFi or Bluetooth. The signal may be directly received by the robot, as shown in FIG. 7, or it may be relayed over further devices (router, repeater). As an alternative, for example, the signal may also be acoustic, in which case, for example, a, for humans audible or inaudible, (ultrasonic) frequency may be used. It is then sufficient for the signal to use a single identifier that is assignable to the device (such as, for example, an MAC address, an identity number, a specific signal frequency or any other code), with which the signal S can be coded. This may be determined, in particular, at the time the device is manufactured and need not be modifiable afterwards, which reduces entailed costs (e.g. for used memory space).

The signal S may transport information that can be permanently linked to a certain standard operating region L" (cf. FIG. 6) and the task to be carried out there. This information may be included in the mentioned code (e.g. the mentioned identifier) that is used to code the signal S. At the robot's end, the code (e.g. the mentioned identifier) transmitted via the (coded) signal S can be extracted from the signal S. If this extracted code has previously been assigned to a specific task to be carried out by the robot in a specific region, then the robot will begin carrying out this task in the respective region.

The example of an external device for controlling an autonomous mobile robot that derives the energy for its own operation by means of energy harvesting techniques, as described above, can be expanded upon. In the most general terms, energy harvesting is understood to mean the "collecting" of energy from the environment and/or from the energy that is exerted when a device is used (e.g. by mechanical labor as when a switch is actuated). Various physical effects can be utilized to generate electrical energy such as, e.g. the piezoelectric effect, the thermoelectric effect, the photoelectric effect, osmosis, mechanical labor involving movement, induction, etc. Instead of the switch 213 mentioned above, the device may also have a sensor for detecting one or more parameters such as, e.g. the humidity in a flower pot, the pH value in a swimming pool. The measured parameter value (or values dependant thereon) are wirelessly transmitted to the robot which then, based on these values (or based on numerous values received over a certain period of time), reacts in a specified manner (e.g. by carrying out a previously defined task at a previously defined place). The robot, for example, can water the flowers or correct the pH value of the pool by adding a chemical. The decision as to which action should be carried out by the robot can be made in the robot or in a server connected to the same (e.g. a cloud service).

FIG. 8 illustrates another possibility for assigning to an autonomous mobile robot the specific task of cleaning up a locally dirtied area. FIG. 8A shows an example apartment as the area of employment G of an autonomous mobile robot 100, wherein a simplified map of the area of employment G can be displayed on a human-machine interface such as a tablet PC 200 (cf. also FIG. 1). After the corresponding operational mode of the robot 100 has been activated (e.g. by pressing a button displayed on the touch screen of the table PC 200, designated in FIG. 8B as "spot"), the user can select a point P on the map (see FIG. 8B). The coordinates of the point P designated by the user can be sent to the robot. This point P will serve, for example, as the center point of a standardized region L (such as, for example, a square, cf. FIG. 4A or 5A). The standardized region L to be cleaned will now also be displayed on the map (see FIG. 8C). The user can confirm this by pressing the "OK" button or cancel the entire process by pressing the "Cancel" button. If the user again touches the standardized region L, for example, he can use his finger to shift the region and so better adapt it to his preferences, as a result of which a modified region L' is determined by the user. It is also possible to automatically adapt the standardized region L to the environmental conditions of the region L based on the existing map data and thus automatically determine the modified region L'. This can be carried out in the same manner as was described with reference to FIGS. 4 and 5. In this case, for example, the standardized region L is aligned along a nearby wall or it is extended to the wall.

If the user touches the map (e.g. displayed on the tablet PC 200), at a different point outside the standardized region L, a further point P can be added. This can also be shifted to an appropriate position. In this manner, the user can assign numerous smaller tasks to the robot. The robot can independently plan how to carry these out. It can thus plan the sequence, for example, such that as little time as possible will be needed to complete the processing. If two (or more) regions overlap or lie very close to each other (at a distance smaller than a specifiable maximum value), the robot can independently combine the two (or more) standardized regions L into one new region. In simplest of cases, the standardized region L is always a square or a circle of the same size, for example, surrounding the point P designated by the touch of a finger. Alternatively, the user may select one of various predefined quantities (lateral length, radius, surface area) and shapes (circle, square, rectangle) from a menu displayed on a table PC 200.

Figure 8A:
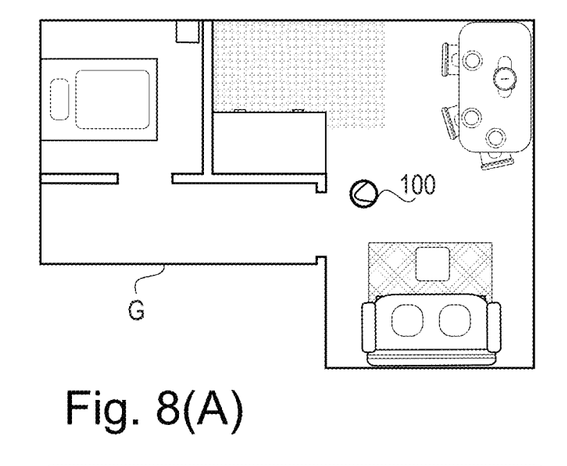
FIG. 8 shows the operation of the robot by means of a tablet PC for an operation in a locally delimited region of the area of robot employment.
Figure 8B:
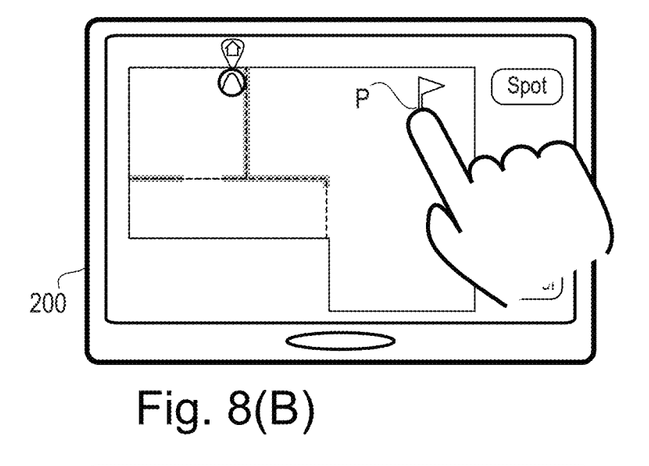
Figure 8C:
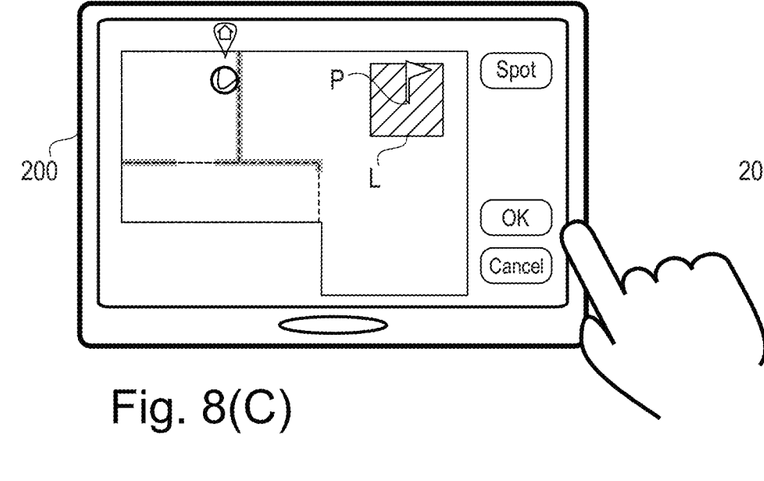
Figure 8D:
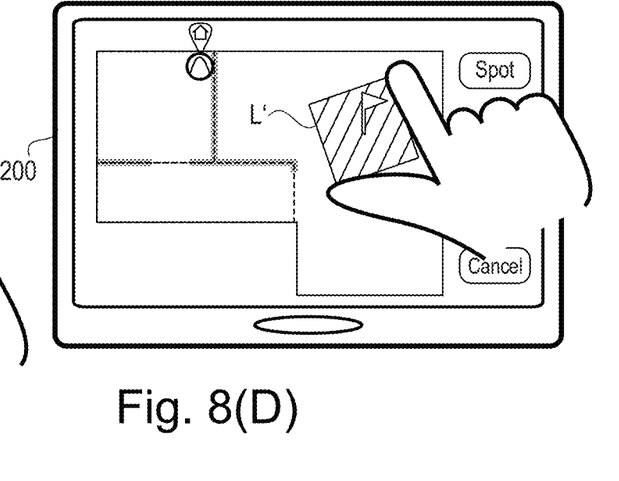

In the example shown in FIG. 8D, the user can freely adjust the size and orientation of a quadratic region L by touching the screen with two fingers and thus defining a modified region L'. This is done, for example, by determining two diagonally opposing corner points of the square by touching the screen with the fingers. This may alternatively be carried out with a swipe movement over the touch screen, wherein the user places his finger on the desired center point of the region to be cleaned and moves his finger away from that point (along the screen). The direction and distance of the swipe movement defines the orientation and size of the region to be defined.

As described above, the cleaning begins as soon as the user has confirmed the assignment, for example by pressing an OK button, and the robot has reached a previously specified region L or L'. In order to start its work more quickly, the robot can set out from its current position (e.g. the base station) and start moving in the direction of the first inputted position while the user is still making the input (see, e.g. the robot position in FIG. 8C). If the user waits until the robot has reached the designated position before confirming the cleaning task, then this gives the user a direct confirmation that his map input corresponds to an important real position. If needed the position may be corrected, which minimizes mistakes caused by incorrect use.

Since the map that a robot uses for navigation is generally complex and difficult for a human user to read, the user can be shown a greatly simplified and easy to interpret map. The user may then indicate the position P of the region L to be cleaned on this simplified map. After this, the position P is transformed by means of coordinate transformation into coordinates on the map that the robot 100 uses for navigation. Both the compilation of the simplified map based on the robot map, as well as the coordinate transformation between the two maps can be carried out on the robot 100, on the human-machine interface 200, or on an external computer (in particular a cloud service accessible via internet).

In the example described above with reference to FIG. 8, the robot is given a work assignment by means of user interaction on a map of the area of robot employment, for which an electronic map is needed that can be displayed on a human-machine interface (MMI, e.g. tablet PC 200). In principle, this map can be a permanently saved map that was learned by the robot 100, for example, during an exploratory run or that was provided by the user. In this connection, "permanently" saving a map only means that the map is not compiled anew by the robot every time it is employed, but rather that it is principally intended to be used every time the robot is employed (with no time limit on this, hence permanent). In particular, permanent should not be understood to mean here unchangeable or write-protected, but instead only refers to the theoretically unlimited use of a saved map. The problem with such a permanently saved map is that, for example, as a result of changes in the environment of the robot (such as the displacement of furniture), the map becomes out of date and may thus contain invalid and/or false data. The purpose of the method described in the following is to avoid this problem of out of date data while still providing a map of the area of robot employment to the user for interaction.

In order to achieve this purpose, the entire map date is compiled anew, for example, using a SLAM method, during every (complete) cleaning run. When doing so, the old map data is deleted at the beginning of the (complete) cleaning run (see FIG. 9, box 94) and a new map is compiled (see FIG. 9, box 91). By regularly carrying out a complete cleaning, the data shown to the user that is based on the map information is always up to date. A disruption of the cleaning run due to invalid and/or false map information is prevented. The map data encompasses, for example, information about obstacles in the environment, about the accessible surface and/or about the surface to be processed. The recorded map data can be displayed to the user on a human-machine interface (e.g. tablet) while the cleaning run is still being carried out, allowing the user to monitor the progression of the processing. A complete cleaning run means that all accessible regions of the area of robot employment are processed. This complete cleaning run may be started, for example, manually by a user pressing a "clean" button on the robot or over an external HMI (e.g. a tablet PC). Alternatively, the complete cleaning run can be started by the user at a previously defined point in time using a calendar function of the robot. This calendar function can initiate, for example, a complete cleaning run every day at 9 am.

After a complete cleaning, the robot returns, for example, to its initial position or to the base station (cf. FIG. 6, base station BS) and waits for further user commands. In this connection, the user can have, for example, map-based data such as, for example, a cleaning map on which the cleaned regions are marked, displayed on an HMI (e.g. tablet PC). The new, previously compiled map is used for the subsequent user interactions (see FIG. 9, box 92). Afterwards, the user, for example, may send the robot to a certain point of the accessible area or select another area to be processed. This may be, as described above, a standardized region that has a previously defined basic geometric shape (see regions L, L' in FIGS. 3-5). Alternatively, the user, for example, can select a polygon as the shape of the region to be processed. To do so, for example, he can mark the corner points of the polygon on the map. Any number of input forms for the region to the processed are conceivable. Hereupon the robot moves to a point of the region thus determined to be cleaned and cleans all accessible areas. Here again, for example, it may use a SLAM method to reliably navigate with the previously gathered map data.

A further user intervention might be the relocation of the robot. For this purpose the robot is picked up by the user and put down in a new area of employment (e.g. on a different floor) or on a new position of the present area of employment, which the robot can detect, for example, by means of a wheel contact switch. In this case the robot can attempt to determine its position on the old map (global localization, FIG. 9, box 93). To carry out this (global) localization, the robot gathers, for example, map data in the environment of the location on which it was placed. This map information is compared with the old map information to determine whether there is a correlation with identified features of the environment and if so, how far the correlation extends. If there is a correlation, then the position of the robot on the old map can be determined and thus used for the navigation of the robot and further user interactions. If it is not possible, for example, within (and/or after) a specifiable period of time, a specifiable number of attempts and/or with a specifiable amount of map information (e.g. a limit on memory space use), to recognize a specifiable amount of accuracy in the correlation between the new and old map information, the localization is considered to have failed. In this case the old map is deleted (FIG. 9, box 94) and a new map is compiled based on the new, just gathered map information. In particular, if the robot is displaced during a cleaning run and the (global) localization is not successful, the robot begins the cleaning run anew from its current position.

Figure 9:
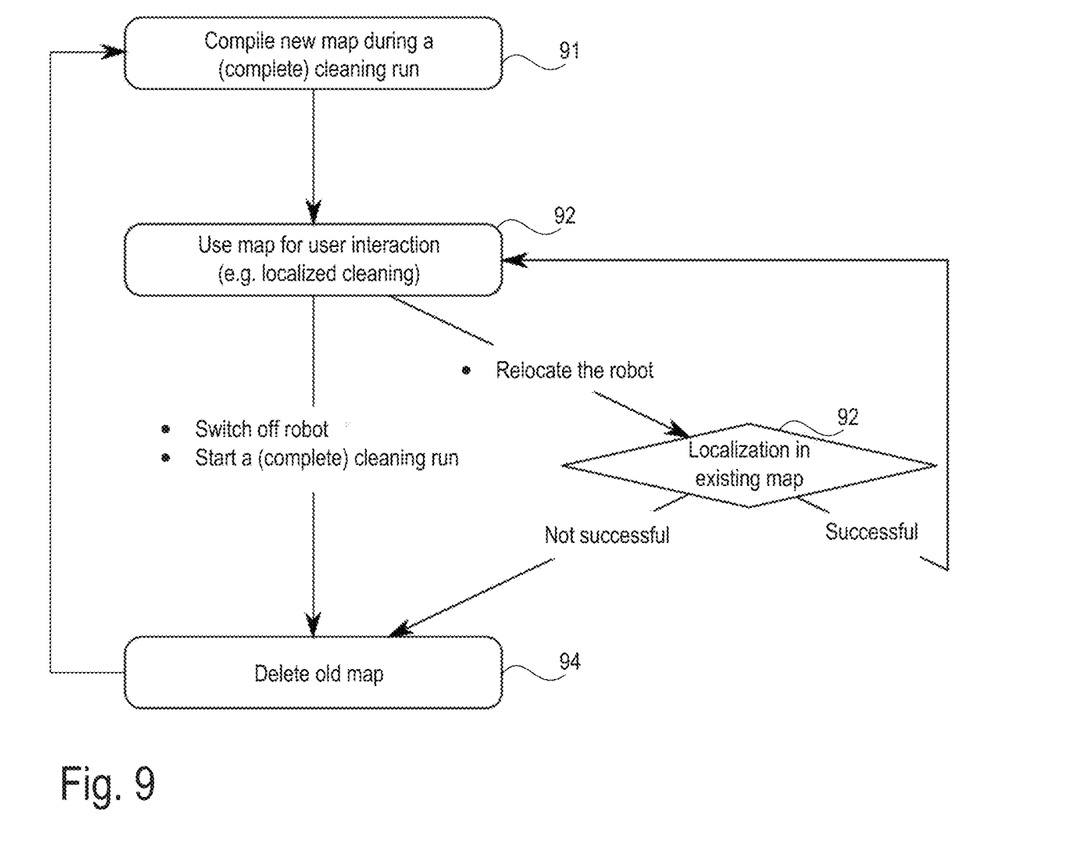
FIG. 9 shows a flow chart regarding the user interaction of the robot by means of a map of the area of robot employment newly compiled during operation.

A further user intervention is the complete shutdown of the robot. In this case the robot can no longer detect a relocation. After a restart of the robot it can attempt, for example, to localize itself in the old map data. In an alternative embodiment the previously gathered map information is saved on a volatile memory, causing it to be automatically deleted when the robot is shut down (FIG. 9, box 94). After the robot is restarted, new map information is gathered.

Adopting the approach outlined above, an autonomous mobile floor processing machine can be controlled in the following manner. First, all map information is deleted before the start of a complete floor processing in the area of employment of the floor processing machine. During the complete floor processing, new map information is gathered. The newly gathered map information is displayed, as described above, on a human-machine interface in order to allow a user interaction. At least one user command, which is based on the displayed map information, is received by this human-machine interface and the autonomous mobile floor processing machine is controlled in accordance with the user command and the newly gathered map information. For this the floor processing machine needs a navigation module (see also FIG. 1) that is configured to detect map information regarding the environment of the floor processing machine and, with this information, to localize itself and navigate. The map information is at least partially displayed on at least one human-machine interface. The floor processing machine is configured to receive at least two different user commands from the at least one human-machine interface, whereas one of the user commands refers to the previously described complete floor processing of the area of employment of the floor processing machine.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond unless otherwise indicated to any component or structure that performs the specified function of the described component (e.g., that is functionally equivalent), even if it is not structurally equivalent to the disclosed structure that performs the function in the herein illustrated exemplary implementations of the embodiments described herein.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method for controlling an autonomous mobile robot with a human-machine interface (HMI), comprising:
   providing the robot that comprises a processor for executing process instructions, a storage element with an electronic map, and a sensor for navigation and orientation in an environment, and
   wherein robot and HMI are configured to exchange data via a communication connection;
   displaying the map on the HMI;
   receiving a selection of a point by the user by marking the point on the map;
   automatically controlling the robot to begin processing of a certain region that is dependent on the selected point.

2. The method in accordance with claim 1,
   wherein the certain region has a previously defined basic shape, size and orientation and
   wherein parameters of basic shape, size, orientation, or a combination thereof, are automatically adapted based on first information saved on the electronic map.

3. The method in accordance with claim 2,
   wherein the first information refers to wall location, wall position, type of floor covering, obstacle location, shape of obstacles or a combination thereof.

4. The method in accordance with claim 1,
   receiving a selection of numerous points on the map;
   calculating an optimal process succession of the numerous points on the map to minimize a total required time;
   processing by the robot, for each point of the numerous points on the map and based on the calculation of the optimal process succession, a region associated with each point of the numerous points on the map.

5. The method in accordance with claim 1,
   receiving a selection of numerous points on the map;
   processing by the robot, for each point of the numerous points on the map a region associated with each respective point, and
   wherein overlapping regions are combined into one region.

6. The method in accordance with claim 1,
   wherein every certain region is adaptable in size and/or orientation over the HMI by gestures detected by a touch screen.

7. The method in accordance with claim 6,
   automatically moving the robot to a position defined by a first selected point before the user has finished marking further points and adapting the certain region.

8. A method for controlling an autonomous mobile robot to carry out an activity in a localized region of an area of robot employment, the method comprising;
   positioning the robot at a starting position within the area of robot employment;
   detecting information regarding an environment of the robot by a sensor;
   selecting a region having a certain basic geometric shape; and
   automatically determining, based on the detected information regarding the environment, a size of the selected region, a or position of the selected region, or both.

9. The method in accordance with claim 8,
   wherein the position of the selected region depends on the starting position.

10. The method in accordance with claim 8,
    wherein the basic geometric shape is selected in dependency on the detected information regarding the environment.

11. The method in accordance with claim 8, wherein the automatic determination comprises;
    modifying a region, beginning with a standard size and a standard orientation of the basic geometric shape, by rotating at least one of an additional sub-region, shifting the at least one additional sub-region, scaling the at least one additional sub-region, expanding the at least one additional sub-region, or a combination thereof.

12. The method in accordance with claim 8,
wherein the sensor is a dirt sensor that is configured to detect dirtied areas on a floor surface, and wherein the information regarding the environment of the robot comprises information regarding the dirtied area of at least one part of the floor surface.

13. The method in accordance with claim 8,
wherein the sensor is an obstacle detection sensor,
wherein the information regarding the environment of the robot comprises information regarding the location and position of obstacles.

14. The method in accordance with claim 13, further comprising:
modifying the region by expanding the region by at least one additional sub-region that lies between the region and a detected obstacle.

15. The method in accordance with claim 14,
wherein the region is only expanded if at least one measurement of an additional sub-region lies below a threshold value.

16. The method in accordance with claim 8, further comprising:
modifying the region by rotating the region until it is aligned along a preferred direction.

17. The method in accordance with claim 16,
wherein the sensor is configured to detect, walls, obstacles or borders between differing floor coverings,
wherein the preferred direction is defined by the orientation of a wall, a neighboring obstacle, or, respectively, a border of a floor covering.

18. The method in accordance with claim 8,
wherein the sensor is configured to recognize whether the selected region lies at least partially underneath a piece of furniture; and
wherein the size and the position of the selected region is determined such that the selected region completely encompasses the floor surface lying under a detected piece of furniture or such that the selected region lies completely underneath the detected piece of furniture.

19. The method in accordance with claim 8,
wherein information regarding the environment is saved on an electronic map of the robot; and
wherein the basic geometric shape is selected in dependency on the information saved on the map and/or wherein the size and the position of the selected region is determined in dependency on the information saved on the map.

20. A method for controlling an autonomous mobile robot with a navigation module that comprises a sensor for navigation and orientation in an environment of the robot by an electronic map; the method comprising:
positioning the robot at a starting position within the area of robot employment;
carrying out a self localization, in the course of which the robot determines by the sensor and the electronic map whether the robot is located on the electronic map;
determining the robot position on the map;
carrying out a task, which is associated with the determined position of the robot, by the robot.

21. The method in accordance with claim 20,
wherein the robot, after activation, begins to carry out a standard task while the self localization is still being carried out, and
wherein the task is adapted if, upon completing the self localization, the robot position or a region in which the robot position lies is linked to a task.

22. The method in accordance with claim 20,
wherein the robot, after completing the task, verifies based on a map whether a base station of the robot is accessible and,
wherein if the base station of the robot is accessible, the robot docks onto the base station.

23. The method in accordance with any of claim 22,
wherein the robot, while carrying out a task, takes into consideration whether any danger zones are marked on the map and,
wherein the robot avoids any danger zones are marked on the map.

24. The method in accordance with claim 20, wherein, if no task is linked to the determined position of the robot, the following steps are initiated:
selecting a region having a certain basic geometric shape; and
automatically determining, based on the information detected by the sensor for navigation and orientation in the environment of the robot, the size of the selected region, position of the selected region, or both.

25. The method in accordance with claim 24,
wherein the selected region is displayed in the determined size and/or position on a human-machine interface and the user is offered the possibility of saving the displayed region and linking a task to the displayed region.

* * * * *